Jan. 26, 1954

H. D. GOLDBERG ET AL 2,667,159

PLETHYSMOGRAPH

Filed Dec. 21, 1948

INVENTORS
Harold D. Goldberg
Milton I. Goldberg
Heinz I. Lippmann

BY

ATT'Y

Jan. 26, 1954     H. D. GOLDBERG ET AL     2,667,159
PLETHYSMOGRAPH

Filed Dec. 21, 1948     3 Sheets-Sheet 2

INVENTORS
Harold D. Goldberg
Milton I. Goldberg
Heinz I. Lippmann
BY
ATT'Y.

INVENTORS
Harold D. Goldberg
Milton I. Goldberg
Heinz I. Lippmann

Patented Jan. 26, 1954

2,667,159

UNITED STATES PATENT OFFICE 2,667,159

PLETHYSMOGRAPH

Harold D. Goldberg and Milton I. Goldberg, Bronx, and Heinz I. Lippmann, New York, N. Y.

Application December 21, 1948, Serial No. 66,524

9 Claims. (Cl. 128—2.05)

This invention relates to plethysmographs for measuring the flow of blood in human or animal limbs or other parts of the anatomy by means of volume change indications or recordings. The structure of this invention employs the electromagnetic induction system described in the application filed concurrently herewith, Serial No. 66,523.

Because of the great need of obtaining information concerning the dynamic laws of blood flow and the laws governing the living processes of tissues in their relation to blood flow, various procedures and devices have been employed. Among these are methods of measuring the blood flow through individual blood vessels, requiring contact with, exposure or puncture of, or injection into the vessels, and methods of measuring the total flow to or through organs. The latter include (1) calorimetric methods, applicable primarily to superficial tissue, (2) methods of measuring arterio-venous differences in concentration of various substances for blood flow determination, and (3) plethysmography which, in its various forms, affords a relatively wide field of application.

Among the various types of plethysmographs are (1) the electrical impedance type, (2) the X-ray absorption type, (3) the light absorption type and (4) the fluid type. The first three types are of limited applicability, since they do not provide an absolute measurement, the light absorption method additionally being limited to blood-flow measurements in digits or thin tissues. The fluid plethysmograph is the most important of the group, the transmission media being either water, air or both, the water type being used to measure circulation in forearm, arm, leg, hand and foot, while the air type has been used for measuring circulation in digits.

Although, as aforesaid, fluid plethysmographs are generally the preferred and constitute the most widely used instruments for measuring blood circulation, currently known types nevertheless have certain serious shortcomings, including the following dangers or disadvantages: danger of leakage of the fluid due to the difficulty of providing a tight seal; danger of hindering expansion of the member, or of excessive bellying of the seal due to lack of rigidity; excessive temperature sensitivity (in the case of gas); inertia effect with water; damping effect with gases; physiological effect of the hydrostatic pressure of the water; time-wastage, involving in some cases several hours to complete the determination; cumbersome; lack of sufficient sensitivity; and interference with circulation.

There is accordingly a great need for a device, for use by investigators and clinicians both in civilian life and in the Armed Forces, capable of accurately and simply measuring the total quantity of blood flowing into an extremity per unit of time, and not hampered by the aforesaid disadvantages and shortcomings of known conventional processes. Such a device would be of service in the study of muscle circulation under various physiological conditions, in the study of the formation of new blood vessels and blood vessel innervation and tone, in quantitative as distinguished from the present qualitative diagnostic methods in clinical medicine and in the follow-up of various treatments for occlusive vascular diseases, and in the study of various vascular and circulatory conditions.

It is accordingly primarily within the contemplation of our invention to provide a plethysmographic device capable of filling the aforementioned need. More specifically, this aspect of our invention has for its objects the following: the provision of an instrument with a high degree of accuracy and sensitivity, preferably in excess of physiological measurement requirements, one that may be readily calibrated, that is independent of temperature and physiological environmental influences, that is independent of pressure and acceleration, that does not interfere with normal blood flow, that does not cause discomfort to the subject, that requires relatively short measurement periods, that may be used immediately after exercise, that may be used with overlying clothing and gear, that may be operated by relatively unskilled personnel, and that is simple, easy to fabricate and inexpensive.

In blood flow measurements of a limb or other member by the electro-magnetic induction plethysmograph, it is important that the member be immobilized, so that the motion of the skin with respect to the underlying tissues and the motion of the whole member with respect to the electro-magnetic field be minimized during the measurement. It is accordingly within the further contemplation of our invention to provide a supporting device which will effectively accomplish this objective.

It is another object of our invention to provide a non-conducting stand or support adapted to conveniently and adjustably hold the member being measured in proper and comfortable position.

Another object of our invention is to enable the support for the limb or other member to firmly accommodate the field coils of the said electromagnetic induction plethysmograph, so as to provide a fixed relationship between the magnetic field and the member.

And it is a further object of our invention to provide a simple and easily constructed device capable of performing the functions hereinabove described.

Other objects, features and advantages will appear from the drawings and the description hereinafter given.

Referring to the drawings.

Figures 1, 6:
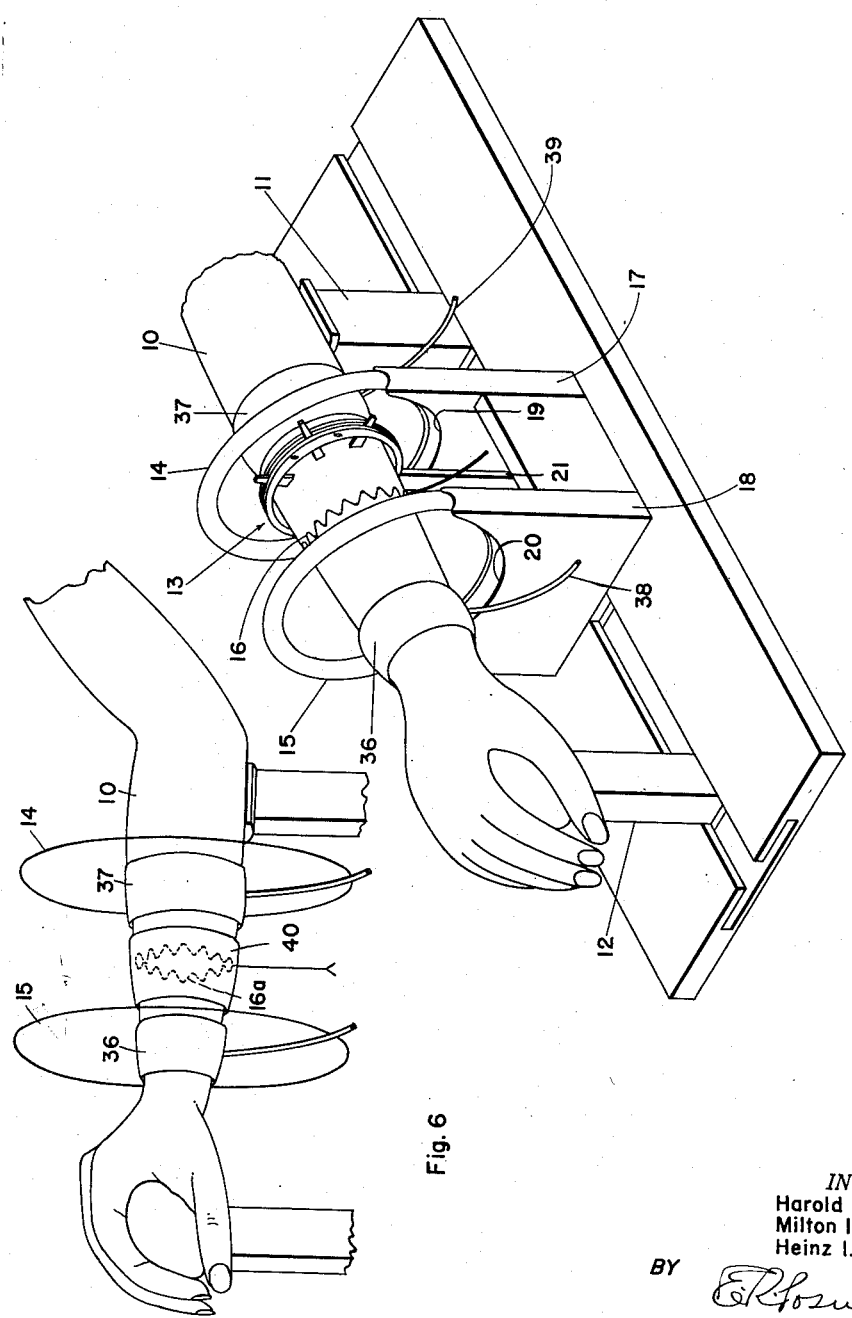
Figure 1 is a perspective view of one form of plethysmograph according to our invention, the illustration showing the device being adapted for measuring the flow of blood in an arm which is shown operatively in place within the structure of our device.
Figure 6 is a perspective view of an arm, pressure cuffs, pick-up device, support for the arm, and a schematic representation of the field coils, this drawing illustrating a form of pick-up positioned within an elastic band.
Figure 2:
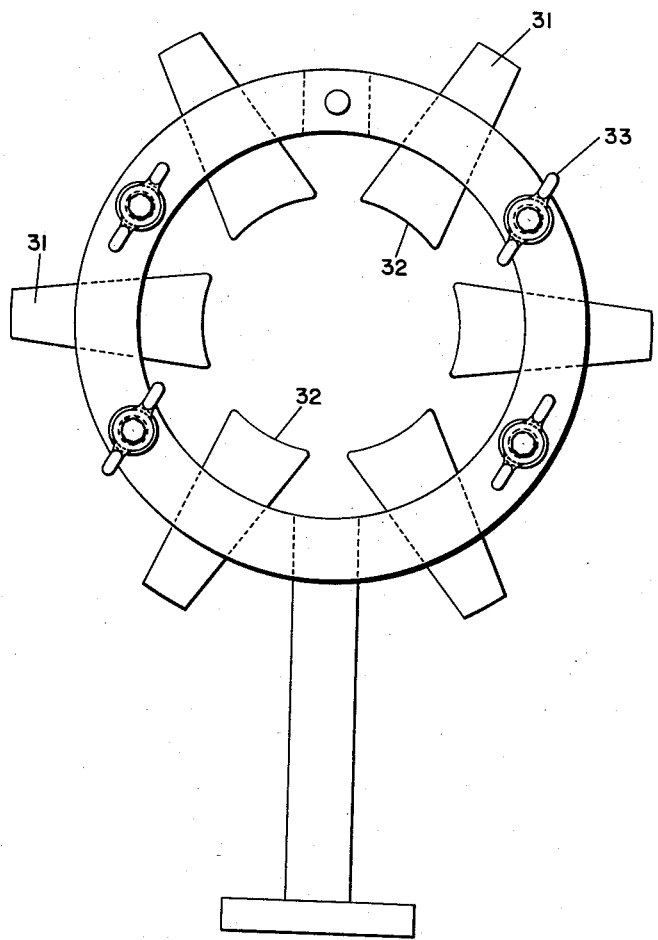
Figure 2 is an enlarged front elevation of the supporting device and skin immobilizer shown in Fig. 1.
Figure 3:
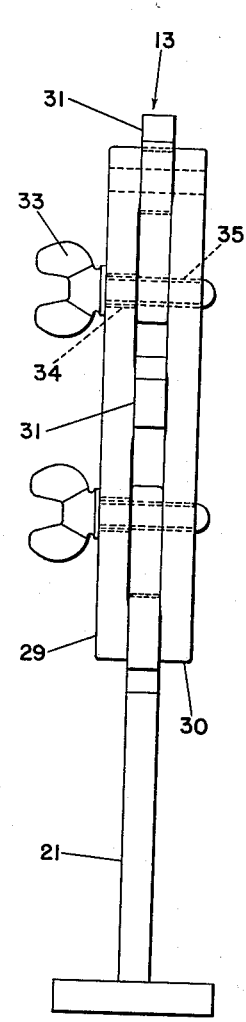
Figure 3 is a side view of Fig. 2.
Figure 4:
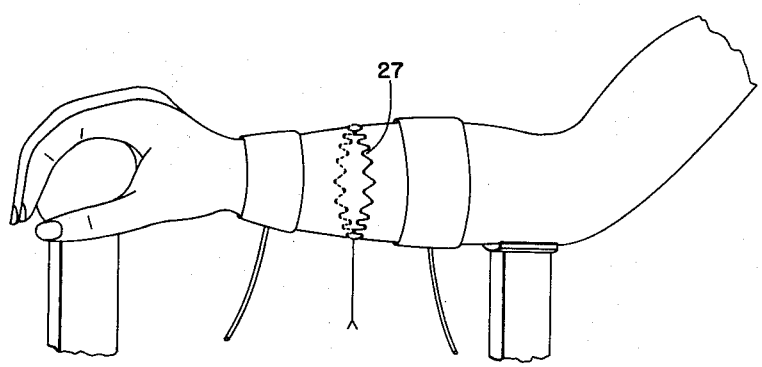
Figure 4 is a perspective view of a portion of the device shown in Fig. 1, with the field coils and skin immobilizer removed.

As aforesaid, this invention includes the use of an electro-magnetic induction system, the device being adapted to measure cross-sectional area changes, instead of water or air being used for that purpose as in conventional fluid plethysmographs. The principle of operation is that the voltage induced in a conducting coil by a uniform alternating magnetic field is directly proportional to the area embraced by the coil. In a preferred form of practicing our invention, the alternating magnetic field is produced by an oscillator-amplifier field coil set-up; and in this field an expansible pick-up coil is placed, encircling the member being measured, the member being positioned parallel to the magnetic field, as will more clearly hereinafter appear. The pick-up coil (hereinafter called the "pick-up") is so constructed that an increase and decrease in its cross-sectional area can be produced without the employment of appreciable force. The arrangement is such that the voltage induced in the pick-up is amplified by suitable electronic equipment, and observed through an oscilloscope or other indicating or recording means. In employing this device to measure the volume of a limb or other member or section, cross-sectional areas may be integrated with respect to its length. Then, by the use of our instrument, volume changes are obtained by integrating changes in cross-sectional areas. The readings measure changes in the voltage output, which are readily translatable into volume changes. By employing suitable electronic circuits, these voltages may be differentiated. In this way, readings may be obtained which are proportional to the area and volume changes per second. When applied to a limb, the volume changes per second produced by common procedures of plethysmography are obtained by integrating the changes in cross-sectional area per second, the results being related and expressed in volume changes per second per unit of initial volume of tissue.

The plethysmographic process employed is the conventional venous occlusion method, permitting measurement of total blood flow. This can be accomplished, as will more clearly hereinafter appear, by applying an inflatable cuff to an extremity, and abruptly increasing the air pressure to a value above the pressure in the veins, but below the arterial pressure, whereby blood may enter the extremity, but not leave it. The volume of the limb will therefore increase by an amount equal to the volume of blood flowing into it through the arteries. After an initial period of a few seconds, an increasing resistance to the flow of blood will develop because the tissues are becoming more fully stretched, and because the pressure in the veins rises as blood enters, until it exceeds that in the air pressure cuff. When this occurs, blood escapes from the limb as rapidly as it enters, and the volume of the extremity no longer increases. Hence, only the initial period is utilized for measuring the blood inflow. An additional pressure cuff may, if desired, be applied at the terminal region of an extremity such as the forearm or leg, with sufficient pressure to keep the terminal, such as the hand or foot, removed from circulation.

In measuring the blood flow in arms or legs, the subject may be placed in a recumbent position, and pick-ups are applied around the member in transverse planes at one or more selected locations, or a pick-up wound in helical form may be used, substantially as illustrated in the drawings. The voltages produced by the helical pick-up or by combining the outputs of the separate pick-ups are translatable to the member's volume, change in volume, or when differentiated to rate of change of volume, the latter being equal to the total quantity of blood inflow per unit time. As aforesaid, the instrument can be adjusted so that it directly indicates or records any or all of these quantities.

In the form of our invention illustrated in Figs. 1 to 5, the arm 10 whose blood-flow is to be measured is operatively supported by the arm rest 11 and hand rest 12, as well as by the intermediate support 13 which also serves the purpose of a skin immobilizer, as will more clearly hereinafter appear. The said intermediate support 13 has a circular or ring-like portion the axis of which extends substantially in the direction of the longitudinal extent of the arm 10. Flanking the support 13 are the two field coils 14 and 15; and disposed between said coils is the expandable pick-up coil 16 in embracing and contacting engagement with the outer surface of the arm 10. The said intermediate support 13, the field coils 14 and 15, and the pick-up 16 are preferably circular members disposed in parallel planes transverse to the longitudinal extent of the member being measured, in the instant case, the arm 10. It is also preferred that the axes of the said circular parts 13, 14, 15 and 16 be coincident.

The said field coils 14 and 15 are immovably held in fixed relative position with respect to each other and to the said rests 11 and 12 by the coil supports 17 and 18, these being of non-conducting material and preferably containing arcuate recessed portions 19 and 20 to receive the lower portions of the coils 14 and 15. The intermediate support 13 is held in its operative position by the standard 21.

Figure 5:
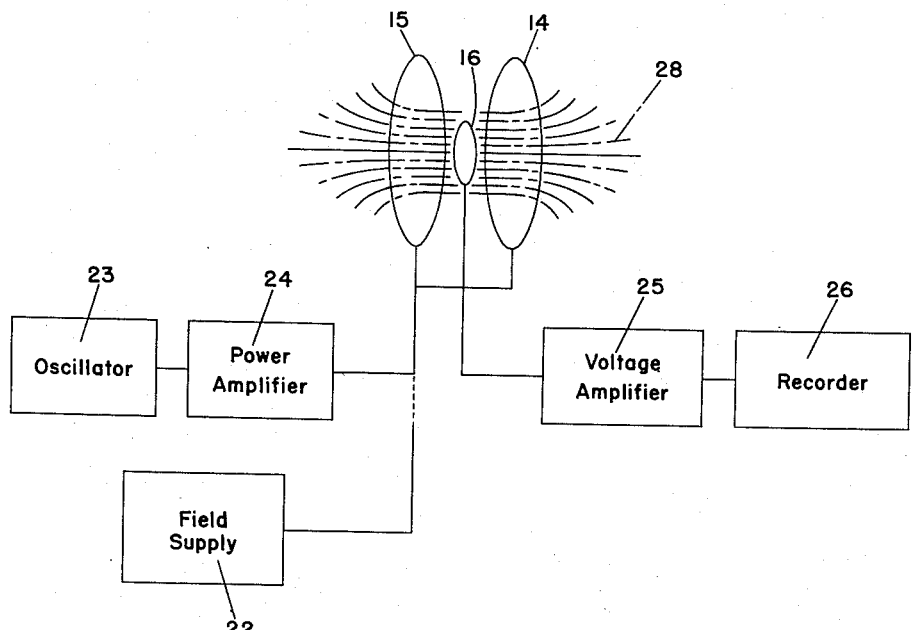
Figure 5 is a schematic diagram showing the field coils and pick-up and the electrical connections therefor.

As will be seen from Fig. 5 the field coils, which may be Helmholtz coils, solenoids or other analogous devices, are operatively energized by the field supply 22, or by the combination of an oscillator 23 and power amplifier 24 electrically connected to each of the coils as illustrated, or by any other means known in the art. The energization of the field coils produces an alternating magnetic field, the central portion of which extends substantially parallel to the axes of the field coils 14 and 15 and the pick-up 16, the magnetic field being intercepted by the said pick-up. It is obvious that a voltage is induced in said pick-up 16 by the alternating magnetic field, and that this voltage can be amplified by any suitable electronic equipment and observed through an oscilloscope or other means. In the illustration of Fig. 5, the pick-up 16 is shown electrically connected to a voltage amplifier 25 and a recorder 26, schematically illustrated.

The pick-up 16 consists of a single turn of fine-gauge conducting wire, of soft temper, the wire being of wavy configuration substantially throughout its entire extent, the bends which form the wavy configuration extending generally in the direction of the axis of the pick-up coil, substantially parallel to the outer surface of arm 10 embraced thereby, the bends forming a plurality of angles 27 between each wave formation. In other words, the wavy or zig-zag formations extend in a direction substantially at right angles to the plane of the pick-up coil 16.

The arrangement is hence such that the pick-up coil 16 will expand together with the member 10 if the latter is caused to expand. The waves or undulations in the pick-up coil 16 obviously permit such expansion; and during this expansion, the only change that takes place in the coil is in the angles 27. This change or deformation of the wavy portions of the coil 16 does not, as a practical matter, affect the voltage induced therein, since this represents changes substantially in a direction parallel to the magnetic field, as indicated by the lines 28 of Fig. 5. This is true even where the member being measured is not of uniform cross-section throughout its length, the compensating or opposing changes in the wavy portions of the pick-up coil obviously producing correct average values. Thus, the use of a pick-up coil of the above-described construction is particularly adapted for use with our apparatus, since it expands together with the expansion of the embraced member being measured and does not, during the process of expansion, introduce extraneous factors which may have an effect upon the induced voltage. Furthermore, the wavy configuration produces a yieldable structure which eliminates the danger of stretching the wire, a condition which would cause a change in resistance and would accordingly affect the induced current. The thinness and softness of the wire permit the coil to expand readily with the increase in cross-section of the embraced member, since very little force is necessary to overcome the resistance the wire affords to such an expansion. It should be observed that if the wire were not readily responsive to the expanding action of the member being measured, and would not easily expand therewith, it would exert a binding effort around the embraced area and thereby hinder its expansion, an action which would be particularly objectionable in the case of the measurement of soft tubes or living tissue.

The intermediate support 13, in the form thereof illustrated, consists of two spaced parallel flat circular rings 29 and 30, and a plurality of radially disposed skin-holding members 31 each containing arcuate inner terminals 32 adapted for contacting engagement with the outer surface of the body portion whose blood-flow is to be measured, such as the arm 10. Said members 31 are slidably movable between said flat rings 29 and 30, and are adapted to be frictionally held in predetermined position between said rings by means of the screw members 33 the shanks of which extend through the holes 34 in ring 29 and are in threaded engagement with the threaded holes 35 in ring 30. It is thus apparent that upon an operative radial adjustment of the members 31, the device can be made to accommodate arms, or other members to be measured, of various proportions. And since each member 31 is separately adjustable, members of irregular contour can be operatively accommodated within the supporting member 13.

The structure illustrated thus enables the arm 10, or any other suitable body portion being measured, to be operatively immobilized, the arm and hand rests 11 and 12 maintaining the limb in fixed relative position with respect to the field coils 14 and 15, and the radially movable elements 31 immobilizing the skin with respect to the underlying tissues.

It will be further observed that the arm 10 has placed thereover forward and rear air pressure cuffs 36 and 37, respectively. These are conventional cuffs used in venous occlusion plethysmographic methods. Air pressure is applied to front cuff 36 by tube 38, and to cuff 37 by tube 39. The method is, as aforesaid, to abruptly increase the air pressure of the cuff placed at the extremity being measured, the air pressure being brought up to a value above the pressure in the veins, but below the arterial pressure, so that blood may enter the extremity but not leave it. For example, the air pressure in cuff 37 may be between 30 to 70 mm. Hg. The cuff 36, applied to the terminal region of the portion of member 10 being measured, is supplied with sufficient air pressure to keep the terminal (such as the hand in the instant case) removed from circulation, a suitable pressure for this purpose being between 250 to 300 mm. Hg. By the arrangement above described, the volume of arm 10 will increase by an amount equal to the volume of the blood flowing into it through the arteries. During the initial period of such blood flow, the measurements are taken to determine the blood inflow, since thereafter there will be an increasing resistance to the flow of blood as the tissues are being stretched, and also because the pressure in the veins rises as blood enters until it exceeds that in air pressure cuff 37.

As the arm 10 expands during said initial period, due to the inflow of blood therein, the correspondingly expanding pick-up coil 16 encloses an increasing number of the lines of force produced by field coils 14 and 15, whereby the greater voltage induced in said pick-up coils will indicate the cross-sectional area change. Obviously, if a number of such readings are taken, or if a number of independent pick-ups are employed (as shown in the concurrently filed patent application, Serial No. 66,523), and the individual cross-sectional areas integrated with respect to the length of the limb, volume changes can be measured. The volume changes per second can readily be expressed in volume changes per second per unit of initial volume of tissue, as in ordinary plethysmographic procedures.

The said pick-up coil 16 may be applied to the limb 10 without any holding means other than the resiliency of the woven wire itself. However, if need be, the coil may be cemented to the section with a suitable elastic medium.

Another method of operatively applying the pick-up is by means of an elastic cuff 40 (Fig. 6) the inner surface of which contains the pick-up coil 16a. This cuff is applied in obvious manner over the arm 10, whereby an expansion of said arm will cause a corresponding yieldable expansion of the pick-up coil 16a. The arrangement here is such as to obviate the need of cementing means and permit an operative expansion of coil 16a in conformity with the expanding member.

It is thus apparent that with the device above described, plethysmographic measurements can be conveniently obtained without the use of the conventional fluid methods, and by means of a device that can be readily calibrated, that is independent of pressure and physiological environmental influences and other factors which frequently interfere with known plethysmographic processes. Furthermore, the device is such as not to interfere with the normal blood flow, regardless of which of the various pick-ups above described are employed, and without any discomfiture to the subject. It is also obvious that measurements can be effectuated quickly, and be taken by relatively unskilled personnel.

Still another type of pick-up adaptable with this invention is a line or band of conducting ink painted around the member being measured, this pick-up obviously expanding with an expansion of the member.

In the description, the invention has been disclosed merely by way of example and in preferred manner; but obviously there may be many variations, modifications and adaptations which will still be comprised within its spirit. For example, instead of a wire pick-up coil of the specific type shown in the drawings, other pick-up conductors may be employed such as an inflated cuff, in accordance with the said concurrently filed application. It is to be understood, therefore, that the invention is not limited to any specific form or manner of practicing same, except insofar as such limitations are specified in the appended claims.

We claim:

1. In a plethysmograph for measuring the blood flow through a body member, two field coils energized by an oscillating current source whereby an alternating magnetic field is created therebetween, a pick-up coil therebetween and within said magnetic field whereby a voltage is induced in the pick-up coil, voltage-responsive means electrically connected to the pick-up coil, the said field and pick-up coils having central openings in longitudinal alignment and proportioned for accommodating therethrough said member, the pick-up coil being expandable and proportioned for embracing contacting engagement with said member whereby changes in the cross-sectional area of the body member will produce corresponding changes in the proportions of the expandable pick-up coil, and a support intermediate said field coils and laterally adjacent said pick-up coil, said support being proportioned for supporting engagement with the body member when the latter member is in operative engagement with the pick-up coil.

2. In a plethysmograph for measuring the blood flow through a body member, the combination according to claim 1, further provided with two fixed non-conducting supports for the field coils, whereby said coils are maintained in predetermined spaced relation for obtaining a constant magnetic field therebetween, said support being of circumferential configuration and proportioned for embracing engagement with the body member, said support being in substantial axial alignment with the said pick-up coil.

3. In a plethysmograph for measuring the blood flow through a body member, the combination according to claim 2, said field coil supports having concave arcuate seats in supporting engagement with the lower portions of the coil, whereby the supports are in unobstructing relation to the central openings of the coils.

4. In a plethysmograph for measuring the blood flow through a body member, the combination according to claim 1, further provided with two fixed non-conducting supports for the field coils, and oppositely disposed outer supports flanking said field coils and positioned for supporting engagement with a member operatively extending through the central openings of said coils.

5. In a plethysmograph for measuring the blood flow through a body member, the combination according to claim 1, said intermediate support having a plurality of skin-engaging elements in spaced circumferential relation and adapted for engagement with the member being measured.

6. In a plethysmograph for measuring the blood flow through a body member, the combination according to claim 5, the said intermediate support having two adjacent flat rings releasably and frictionally holding therebetween said skin-engaging elements, said elements being adjustably movable radially with respect to said rings.

7. In a plethysmograph for measuring the blood flow through a body member, the combination according to claim 1, further provided with a stretchable cuff of elastic material adapted for embracing engagement with the body member being measured, the pick-up coil being disposed along the inner surface of the cuff.

8. A plethysmographic pick-up coil cuff of the class described for embracing engagement with a body member being measured, comprising a flat stretchable band of elastic non-conducting material, and an expandable pick-up coil disposed along the inner surface of the band and positioned for contacting engagement with said body member.

9. In a plethysmograph for measuring the blood flow through a body member, field coil means energized by an oscillating current source whereby an alternating magnetic field is created in the region of said field coil means, a pick-up coil adjacent said field coil means and within said magnetic field whereby a voltage is induced in the pick-up coil, voltage-responsive means electrically connected to the pick-up coil, said field coil means and said pick-up coil having central openings in longitudinal alignment and proportioned for accommodating therethrough said member, the pick-up coil being expandable and in embracing contacting engagement with said member, whereby the changes in the cross-sectional area of the body member will produce corresponding changes in the expandable pick-up coil, and a support adjacent said field coil means and said pick-up coil, said support being proportioned for engagement with the body member when the latter member is in operative engagement with the pick-up coil.

HAROLD D. GOLDBERG.
MILTON I. GOLDBERG.
HEINZ I. LIPPMANN.

References Cited in the file of this patent

UNITED STATES PATENTS

| Number | Name | Date |
|---|---|---|
| 1,594,053 | Evans | July 27, 1926 |
| 1,610,971 | Ruben | Dec. 14, 1926 |
| 2,124,579 | Knerr et al. | July 26, 1938 |
| 2,184,511 | Bagno et al. | Dec. 26, 1939 |
| 2,266,231 | Mazzeo et al. | Dec. 16, 1941 |
| 2,352,874 | Williams et al. | July 4, 1944 |
| 2,452,799 | Speaker et al. | Nov. 2, 1948 |

FOREIGN PATENTS

| Number | Country | Date |
|---|---|---|
| 132,204 | Austria | Mar. 10, 1933 |
| 557,433 | Germany | Aug. 23, 1932 |
| 687,916 | Germany | Feb. 8, 1940 |